(12) United States Patent
Fan et al.

(10) Patent No.: US 10,897,354 B2
(45) Date of Patent: Jan. 19, 2021

(54) SYSTEM AND METHOD FOR PRIVACY-PRESERVING DATA RETRIEVAL FOR CONNECTED POWER TOOLS

(71) Applicant: Robert Bosch GmbH, Stuttgart (DE)

(72) Inventors: Xinxin Fan, Pittsburgh, PA (US); Jorge Guajardo Merchan, Pittsburgh, PA (US); Daniel Vesenmaier, Leinfelden (DE)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 16/158,947

(22) Filed: Oct. 12, 2018

(65) Prior Publication Data

US 2019/0229905 A1 Jul. 25, 2019

Related U.S. Application Data

(60) Provisional application No. 62/619,311, filed on Jan. 19, 2018.

(51) Int. Cl.
*H04L 29/00* (2006.01)
*H04L 9/08* (2006.01)
(Continued)

(52) U.S. Cl.
CPC .......... *H04L 9/0866* (2013.01); *G06F 21/602* (2013.01); *H04L 9/0894* (2013.01);
(Continued)

(58) Field of Classification Search
CPC ....... H04L 9/0866; H04L 9/14; H04L 9/0894; H04L 67/125; H04L 2209/805;
(Continued)

(56) References Cited

U.S. PATENT DOCUMENTS 6,005,945 A * 12/1999 Whitehouse ....... G07B 17/0008
380/51
7,752,085 B2 * 7/2010 Monroe ................ A61M 5/178
705/26.1
(Continued)

OTHER PUBLICATIONS

Garfinkel, Simson L. "De-Identification of Personal Information," NISTIR 8053. Internet Source: http://dx.doi.org/10.6028/NIST.IR.8053, Oct. 2015. 54 pages. (Year: 2015).*
(Continued)

*Primary Examiner* — Don G Zhao
(74) *Attorney, Agent, or Firm* — Maginot, Moore & Beck LLP

(57) ABSTRACT

A method for network-connected tool operation with user anonymity includes generating a first cryptographic key that is stored in a memory in the power tool, generating a first encrypted serial number for the power tool based on an output of an encryption function using the first cryptographic key applied to a non-encrypted serial number for the power tool stored in the memory, and generating usage data based on data received from at least one sensor in the power tool during operation of the power tool. The method further includes transmitting the usage data in association only with the first encrypted serial number from the power tool to a maintenance system to enable usage data collection that prevents identification of the power tool as being associated with the usage data.

17 Claims, 5 Drawing Sheets

(51) Int. Cl.
    *H04L 29/06*            (2006.01)
    *H04L 29/08*            (2006.01)
    *H04W 4/38*             (2018.01)
    *H04W 4/70*             (2018.01)
    *H04W 12/00*           (2009.01)
    *G06F 21/60*            (2013.01)
    *H04L 9/14*              (2006.01)

(52) U.S. Cl.
    CPC ................ *H04L 9/14* (2013.01); *H04L 63/04* (2013.01); *H04L 63/0407* (2013.01); *H04L 63/0428* (2013.01); *H04L 63/06* (2013.01); *H04L 63/0876* (2013.01); *H04L 63/126* (2013.01); *H04L 67/125* (2013.01); *H04W 4/38* (2018.02); *H04W 4/70* (2018.02); *H04W 12/00* (2013.01)

(58) Field of Classification Search
    CPC ..... H04L 63/04; H04L 63/061; H04L 63/126; H04L 63/0428; H04L 63/0876; H04L 63/06; H04L 63/0407; H04L 2209/42; H04L 2209/84; H04W 84/18; H04W 12/009; H04W 4/70; H04W 4/38; H04W 12/02; H04W 12/00; G06F 21/602; G06F 21/6254
    See application file for complete search history.

(56) References Cited

U.S. PATENT DOCUMENTS

| | | | |
|---|---|---|---|
| 7,903,820 | B2 | 3/2011 | Waisbard |
| 9,485,254 | B2* | 11/2016 | Kuang .................... G06F 21/44 |
| 9,906,952 | B2* | 2/2018 | Warren ................ G06F 21/602 |
| 10,326,803 | B1* | 6/2019 | Haney ..................... H04L 63/30 |
| 2007/0133807 | A1 | 6/2007 | Lee et al. |
| 2007/0222555 | A1* | 9/2007 | Tengler ................ H04L 9/3263 340/5.6 |
| 2008/0187137 | A1 | 8/2008 | Nikander et al. |
| 2010/0185847 | A1 | 7/2010 | Shasha et al. |
| 2010/0306533 | A1 | 12/2010 | Phatak |
| 2012/0092157 | A1* | 4/2012 | Tran ..................... A61B 5/0476 340/539.12 |
| 2013/0318632 | A1 | 11/2013 | Keoh et al. |
| 2014/0070924 | A1* | 3/2014 | Wenger .................... B25F 5/00 340/10.1 |
| 2015/0262134 | A1* | 9/2015 | Daley .................... G06Q 10/20 705/305 |
| 2015/0281954 | A1* | 10/2015 | Warren .................. G06F 21/74 713/171 |
| 2016/0182486 | A1 | 6/2016 | Wu et al. |
| 2017/0178072 | A1 | 6/2017 | Poomachandran et al. |
| 2018/0144341 | A1* | 5/2018 | Karkkainen .......... H04L 9/3263 |

OTHER PUBLICATIONS

FIPA BC Freedom of Information and Privacy Association, "The Connected Car: Who is in the driver's seat—A study on privacy and onboard vehicle telematics technology" —Internet Source: https://fipa.bc.ca/wordpress/wp-content/uploads/2018/01. Published in Canada. Jan. 2018. 123 pages (Year: 2018).*
Mazonka, Oleg and Popov, Vlad; Hasq Hash Chains, Hasq Technology Pty Ltd, Australia, 2014, pp. 1-5.
Chaum, David; Security Without Identification: Transaction Systems to Make Big Brother Obsolete, Communications of the ACM, Oct. 1985, vol. 28, No. 10, pp. 1030-1044.
Wikipedia, Hash chain, https://en.wikipedia.org/wiki/Hash_chain, dated Jan. 23, 2018, 2 pages.
Wikipedia, Inverted index, https://en.wikipedia.org/wiki/Inverted_index, dated Jan. 23, 2018, 2 pages.
Industrial Internet Consortium, "Track and Trace Testbed", available at http://www.iiconsortium.org/track-and-trace. htm, dated Oct. 24, 2018, 5 pages.
Milwaukee Tool. "One-Key™", available at https://www.milwaukeetool.com/one-key, dated Oct. 24, 2018, 9 pages.
Dewalt. "Tool Connect™", available at http://www.dewalt.com/jobsite-solutions/tool-connect, dated Oct. 25, 2018, 16 pages.
Federal Ministry of Justice and Consumer Protection. "Federal Data Protection Act", available at http://www.gesetze-im-internet.de/englisch_bdsg/englisch_bdsg.pdf, 42 pages.
Yavuz, A.A. and Guajardo, J.; Dynamic Searchable Symmetric Encryption with Minimal Leakage and Efficient Updates on Commodity Hardware, Proceedings of the 22nd International Conference on Selected Areas in Cryptography—SAC 2015, Colume 9566, Aug. 2015, pp. 241-159.
Black+Decker, Inc., "Smartech", available at http://www.blackanddecker.com/products/smartech, dated Nov. 2, 2018, 1 page.

\* cited by examiner

SYSTEM AND METHOD FOR PRIVACY-PRESERVING DATA RETRIEVAL FOR CONNECTED POWER TOOLS

CLAIM OF PRIORITY

This application claims the benefit of U.S. Provisional Application No. 62/619,311, which is entitled "System And Method For Privacy-Preserving Data Retrieval For Connected Power Tools," and was filed on Jan. 19, 2018, the entire contents of which are hereby expressly incorporated herein by reference.

FIELD

This disclosure relates generally to the fields of information security, and, more particularly, to systems and methods that preserve privacy in network connected power tools.

BACKGROUND

Recent advances in sensor technologies, micro-electromechanical systems (MEMS), Internet infrastructure and communication standards have enabled "smart" versions of many commonplace devices to detect information about their internal state and operating environments and to communicate with each other as part of the "Internet of Things" (IoT). As a key enabler for building a connected world, the increasing smart devices are changing the way people carry out tasks and potentially transform the world. Estimates for growth of the IoT ecosystem include a forecast of over 28 billion connected autonomous devices by 2020. Those devices produce "smart" environments such as smart grid, smart buildings, smart transportation, connected healthcare and patient monitoring, environment monitoring, connected cars, etc., in which individual devices communicate with each other and with centralized monitoring systems to improve these services.

As in many other industry sectors, the connectivity trend is also recognized as a source of growth for traditional manufactures and their customers. A recently launched collaborative effort called "Track and Trace" has shown that manufactures are developing a testbed for remotely configuring the settings and tolerances of the tools and machines used on the production floor, which will ensure that industrial power tools automatically complete their designated tasks and achieve the highest quality and efficiency necessary for connected manufacturing. Besides bringing the Industrial Internet onto the factory floor, leading power tool manufactures have introduced a number of network-connected power tool solutions into consumer product solutions, including Milwaukee ONE-KEY, DeWalt Tool Connect, Black & Decker SmartTech, just to name a few. Those smart power tools take advantage of the integrated Bluetooth module and typically provide the following functionalities: 1) Customize the settings of one or more compatible power tools using a smartphone or other mobile device; 2) Track the tool utilization across the network of jobs and users and enhance safety by disabling misused power tools remotely; 3) Produce a personalized inventory management system of the power tools; and 4) Provide real time status information about the usage and performance of power tools as well as tool purchase and warranty information.

While connected power tool systems provide benefits for both tool manufacturers and unique user experience for customers, these systems also raise potential security and privacy concerns. For instance, manufactures collect large amounts of usage data about power tools in order to offer value-added services to customers. The network-connected power tools transmit the usage data at frequent intervals during operation. Those data, if not properly handled and protected, can be used to infer sensitive personal and business information about the customers who use the power tools. Moreover, certain geographical regions have enforced specific regulations for enterprises to obtain data protection and data security compliance, which pose challenges for deploying connected power tools in practice. The existing systems for connected power tools that collect user data also enable privacy leakage of the collected data in a manner that could harm the privacy of power tool operators. Consequently, improvements to systems that collect usage information from network-connected power tools that increase user privacy while recording usage data from the power tools would be beneficial.

SUMMARY

In one embodiment, a method for network-connected tool operation with user anonymity has been developed. The method includes generating, with a processor in the power tool, a first cryptographic key that is stored in a memory in the power tool, generating, with the processor, a first encrypted serial number for the power tool based on an output of an encryption function using the first cryptographic key applied to a non-encrypted serial number for the power tool stored in the memory, generating, with the processor, usage data based on data received from at least one sensor in the power tool during operation of the power tool, and transmitting, with a network device in the power tool, the usage data in association only with the first encrypted serial number to a maintenance system to enable usage data collection that prevents identification of the power tool as being associated with the usage data.

In another embodiment, a method for network-connected power tool operation with user anonymity has been developed. The method includes generating, with a processor in the power tool, a plurality of linked cryptographic keys using a first secret cryptographic key stored in a memory in the power tool and a one-way function. The generating further includes generating each linked cryptographic key in the plurality of linked cryptographic keys based on an output of the one-way function applied to a previous linked cryptographic key in the plurality of linked cryptographic keys in a predetermined order starting with the first secret cryptographic key until generating a final linked cryptographic key in the plurality of linked cryptographic keys. The method further includes generating, with the processor, a first encrypted serial number for the power tool based on an output of an encryption function using the final linked cryptographic key applied to a non-encrypted serial number for the power tool stored in the memory, generating, with the processor, usage data based on data received from at least one sensor in the power tool during operation of the power tool, and transmitting, with a network device in the power tool, the usage data in association only with the first encrypted serial number to a maintenance system to enable usage data collection that prevents identification of the power tool as being associated with the usage data.

In another embodiment, a power tool configured for anonymized network-connected operation has been developed. The power tool includes at least one sensor, a memory, a network device, and a processor. The memory is configured to store a non-encrypted serial number, a first cryptographic key, and usage data. The processor is operatively connected to the at least one sensor, the memory, and the network device. The processor is configured to generate the first cryptographic key that is stored in a memory in the power tool, generate a first encrypted serial number for the power tool based on an output of an encryption function using the first cryptographic key applied to the non-encrypted serial number for the power tool stored in the memory, generate the usage data based on data received from at least one sensor in the power tool during operation of the power tool, and transmit the usage data in association only with the first encrypted serial number to a maintenance system with the network device to enable usage data collection that prevents identification of the power tool as being associated with the usage data.

DETAILED DESCRIPTION

Figure 1:
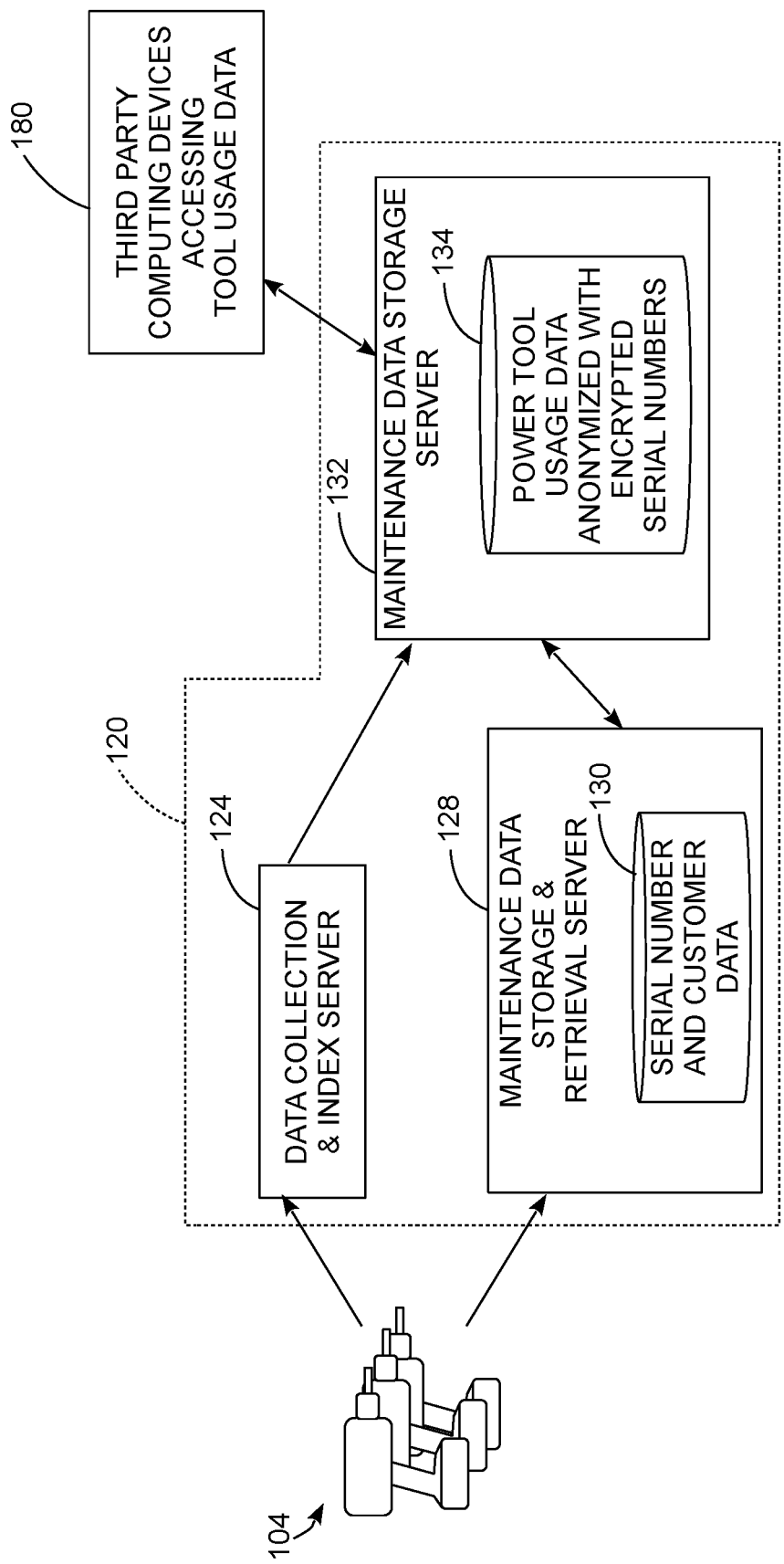
FIG. 1 is a schematic diagram of a system that collects anonymized usage data from power tools.

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "one-way function" refers to a data transformation process performed by a computing device that receives a set of input data and produces output data using the one-way function in a manner that does not enable an observer to reproduce the original input data when provided with the output data beyond a brute-force guessing operation even if the observer has knowledge of the exact operation of the one-way function. A form of one-way function used in the embodiments described herein is a cryptographically secure hash function that produces hash values when provided with input data. As used herein, the term "cryptographically secure hash" or more simply "hash" refers to a numeric output that is generated by a cryptographically secure hash function based on a set of input data. The numeric output is typically on the order of 224 to 512 bits in length depending upon the hash function used. Cryptographically secure hash functions (H) have numerous properties that are known to the art. For purposes of this document, useful features of cryptographically secure hash functions include the one-way property that prevents an attacker from being able to determine the original input data D to the cryptographically secure hash function when provided with the output H(D), which is also known as preimage resistance. Other useful properties are second preimage resistance, which prevents an attacker from generating a different set of data D' that also happen to produce the same hash output H(D') as the original data H(D) even if the attacker is provided with the original data D, and collision resistance, which prevents the attacker from being able to generate any arbitrarily selected sets of data that are different but both produce the same hash output values (e.g. $H(D_1)$ =$H(D_2)$ is impractical for $D_1 \neq D_2$). Examples of cryptographically secure hash functions include the secure hash algorithm (SHA) version 2 and version 3 families of hash functions.

As used herein, the term "hashed message authentication code" (HMAC) refers to a set of numeric data that are used to verify a set of data D using a secret cryptographic key. While the actual data output of an HMAC and a cryptographically secure hash function are often similar in nature (e.g. a 256 bit set of output data for both a hash function and a MAC), the primary difference between the two is that while any computing device that implements a predetermined hash function can generate the hash value for a given set of input data, only computing devices that have access to a cryptographic key (referred to as $K_m$ herein) can generate the MAC for a certain piece of input data. HMAC functions are also a type of one-way function, but not all one-way functions are HMAC functions. An attacker cannot generate a forged piece of data D' that will reproduce the same MAC code for the original data D even if the attacker is provided with D. The attacker cannot generate a different valid MAC for the forged data D' because the attacker does not have access to the secret $K_m$. Some HMAC functions incorporate a cryptographically secure hash function in a larger algorithm to generate the MAC (e.g. MAC=$H(K_m\|H(K_m\|D))$ or MAC=$H(H(K_m \oplus opad)\|H(K_m \oplus ipad)\|D))$ where H is the cryptographically secure hash function, $K_m$ is the key, which may be padded or hashed to fit a data block length used in the hash function if needed, opad and ipad are predetermined padding blocks of data used in some HMAC embodiments, and D is the data for which the MAC is generated. The more complex schemes presented above are used in HMACs to prevent a class of attack known to the art as length extension attacks, although the SHA-3 algorithm is believed to be immune to length extension attacks and may simply be used as $H(K_m\|D)$.

As used herein, the HMAC function also acts as an encryption function that a power tool uses to generate an encrypted serial number that anonymizes usage data transmitted from the power tool to a maintenance system in some embodiments. Without access to the secret cryptographic key, an attacker cannot use the encrypted serial number, which is the output of the HMAC function, to determine the original non-encrypted serial number of a power tool even if the attacker is provided with a list of all the valid serial numbers for power tools used with the maintenance system. During a verification process, the power tool releases the cryptographic key to the maintenance system, which enables the maintenance system to verify the authenticity of the power tool and of the anonymized usage data that were previously transmitted from the power tool to the maintenance system.

As used herein, the term "cryptographic key" or more simply "key" refers to a set of data that can be used in combination with a suitable encryption and decryption scheme to encrypt or decrypt a set of input data. Common examples of keys include a 128-bit or 256-bit set of data that is generated using, for example, a hardware random number generator (RNG), or a cryptographically secure key generation function such as a cryptographically secure pseudo-random number generator (PRNG) that produces a cryptographic key with randomized data that cannot be reproduced by external computing devices in a practical manner. As described in more detail below, a processor in a power tool generates one or more cryptographic keys and as long as the cryptographic keys remain stored only in a memory of the power tool then the power tool can generate encrypted data, such as encrypted serial number data, that no other computing device can decrypt unless and until the power tool transmits the cryptographic key to another computing device.

As used herein, the term "hash chaining" refers to a process that uses a one-way function to produce a "hash chain", which is a series of values that are each "linked" together via the use of the one-way function. For example, a simple three-element hash chain starts with an initial input value $X_0$ and uses a cryptographically secure hash function H as the one-way function to produce a first linked value $X_1=H(X_0)$. To produce an additional linked value $X_2$, the hash chaining process applies the hash function to the previous value $X_1$: $X_2=H(X_1)=H(H(X_0))$. Because of the one-way nature of the hash function H, an observer who receives one value in the hash chain can reproduce subsequent linked values in the chain (e.g. given $X_1$ any computing device can use H to reproduce $X_2$) but the observer cannot reproduce earlier links in the hash chain (e.g. given $X_1$ and the hash function H an observer has no practical way to reproduce $X_0$ beyond brute-force guessing). A computing device can reproduce any given value in the hash chain merely by starting with the appropriate initial value $X_0$ and repeatedly applying the hash function H to a sequence of output values the appropriate number of times to reproduce each link in the hash chain, which requires minimal data storage capacity in a computing device even for hash chains that include a large number of values.

In a hash chain, if the initial value $X_0$ is a cryptographic key $K_0$ that is generated in a cryptographically secure manner with a suitable key length, then the hash chaining process can produce linked output values where each value forms the basis for a subsequent cryptographic key in a plurality of linked cryptographic keys. The series of linked cryptographic keys can be regenerated by a computing device that has access to the initial cryptographic key $K_0$ by first generating key $K_1=H(K_0)$ and repeatedly applying the hash function H to the linked hash chain key values in a predetermined order continuing with the key $K_1$ (e.g. $K_2=H(K_1)$, $K_3=H(K_2)$, etc.) until generating a final linked cryptographic key $K_L$ in a plurality of L linked cryptographic keys. Those of skill in the art will recognize that in some configurations the hash function produces more bits of output data than are required for a cryptographic key, such as a 256 bit hash function output where only 128 bits are required to produce a cryptographic key. The cryptographic key can be derived from the output of the hash function using a deterministic key generation process to enable the generation of each linked cryptographic key based on the output of the hash function that is applied to the previous cryptographic key in the linked chain. The hash chaining process can continue to produce arbitrarily large numbers of linked cryptographic keys based on the linked hash outputs, with some embodiments described herein producing, for example, thousands or millions of linked hash chain values. As described above, in a hash chain an observer that receives a given value within the chain can reproduce subsequent values by applying the one-way function (e.g. hash function H), but cannot reproduce earlier values in the chain.

When the hash chain produces a plurality of linked cryptographic keys, the hash chain can provide forward privacy when the keys are revealed in reverse order, which means that even if an external observer has access to later keys in the hash chain that the external observer cannot reproduce earlier keys in the chain and cannot decrypt any encrypted data that are generated using one of the earlier keys in the chain. For example, in a hash chain formed from L linked cryptographic keys, an observer that is granted access to the final cryptographic key $K_L$ cannot identify the previous linked cryptographic key $K_{L-1}$ or decrypt any encrypted data generated using the key $K_{L-1}$. A client computing device, such as a processor in a power tool described herein, gradually reveals linked cryptographic keys starting from the final key in the chain when necessary during a maintenance operation. The power tool subsequently encrypts data, such as the serial number of the power tool, using a prior cryptographic key in the plurality of linked cryptographic keys in the chain in reverse order to preserve the anonymity of the power tool when transmitting additional usage information from the power tool to a maintenance system even if the maintenance system has been granted access to some of the keys in the hash chain starting from the final key in the hash chain.

FIG. 1 depicts a system 100 that enables power tools to share usage data with a maintenance system while enabling at least partial anonymity for the usage data during operation of the power tools. As used herein, the term "usage data" refers to data generated using one or more sensors in the power tool that are related to the properties of different components in the power tool or conditions experienced by the power tool during operation of the power tool. The system 100 includes a plurality of power tools 104 that communicated with a maintenance system 120. In the system 100, third party computing devices 180 are granted limited access to retrieve and analyze anonymized usage data that the power tools 104 transmit to the maintenance system 120. Examples of third-party computing devices 180 include, for example, analysis systems of component manufacturers that monitor the usage data for a large number of power tools 104 to determine the failure rates and other performance characteristics of different components in the power tools. As described herein, the system 100 reduces or eliminates the ability of a third party computing device 180 and the computing devices within the maintenance system 120 to track the activities of individual power tools based on the usage data that are received from the power tools 104.

The system 100 monitors a large number of power tools 104 that each generate usage data during operation and transmit the usage data to the maintenance system 120 during operation. The specific operation of an individual power tool 104 is described in more detail below, but the system 100 monitors multiple power tools that transmit anonymized usage data to the maintenance system 120. While FIG. 1 depicts a plurality of power hand drills 104 as an example of a power tool, the system 100 can monitor a wide range of multiple types of power tools. Additionally, the term "power tool" as used herein is not strictly limited to drills, saws, nail drivers, percussion devices, and other tools commonly associated with construction; the term power tool also includes a wide range of devices that generate usage data for a maintenance system 120 including, for example, motor vehicles, home appliances, and other devices that require usage data monitoring and maintenance. In the embodiment of FIG. 1, the maintenance system 120 further includes a data collection and indexing server 124, a maintenance data storage and retrieval server 128, and a maintenance data storage server 132, which are embodied as separate computing devices that are implemented using general purpose server hardware in FIG. 1.

The data collection and indexing server 124 receives usage data from the power tools 104 that are transmitted via a data network (not shown). As described below, the power tools 104 transmit usage data in association with encrypted serial numbers to provide anonymity to the individual power tools. The data collection and index server 124 receives the anonymized usage data and retransmits the usage data to the maintenance data storage server 132. In some embodiments, the data collection and index server 124 acts as an anonymizing proxy that strips any extraneous information from the usage data that could be used to identify individual power tools 104. For example, individual power tools 104 that transmit data using a standard internet protocol (IP) network each use an IP address that might be used to track the usage data received from the power tool. The data collection and indexing server 124 removes the IP address and other information that could potentially identify an individual power tool from the usage data prior to transmitting the usage data to the maintenance data storage server 132.

The maintenance data storage and retrieval server 128 implements a database 130 that holds the registration information for the power tools 104, including the non-encrypted serial numbers of the power tools, standard information about the customers who own the power tools 104, warranty information, and the like. In some embodiments, the maintenance storage and retrieval server 128 is implemented using one or more computing devices that are physically located at one or more service facilities that physically receive the power tools 104 during maintenance operations. The power tools 104 only communicate with the maintenance data storage and retrieval server during a maintenance operation, but not during regular operation. As described in further detail below, during a maintenance operation the power tool 104 reveals one or more cryptographic keys to the maintenance data storage and retrieval server 128 to enable the maintenance data storage and retrieval server 128 to retrieve usage data from the maintenance data storage server 132 that pertains to the particular power tool 104 that is being serviced. The maintenance data storage and retrieval server 128 is only granted access to the usage data on a limited basis during the maintenance operation since the usage data are used to diagnose problems in the power tool during the maintenance operation. Additionally, as described below the embodiments described herein that implement forward privacy prevent the maintenance data storage and retrieval server 128 from being able to identify new usage data that a particular power tool 104 generates after the completion of maintenance operation even if the maintenance data storage and retrieval server 128 has been granted access to older usage data for the power tool.

The maintenance data storage server 132 holds a database 134 that stores anonymized usage data that are received from the power tools 104. The anonymized power tool usage data associates sets of usage data with encrypted device serial numbers that correspond to the actual non-encrypted serial numbers of the power tools 104, but that prevent the third party computing device 180 from being able to identify that any particular set of usage data actually corresponds to a particular power tool 104. The encrypted serial numbers do enable the third party computing devices 180 to determine that a single power tool using one encrypted serial number generated a set of usage data over a period of time between maintenance operations, which can provide valuable information to track the performance of different components in an individual power tool over time during the operation of the power tool. However, while the third party computing devices 180 can identify that a set of usage data was generated by one particular power tool 104, during normal operation of the maintenance system 120 the third party devices 180 cannot determine which particular power tool 104 generated each set of usage data. As described in further detail below, even if the maintenance system 120 is compromised by an attacker who removes the anonymity of previously stored usage data by infiltrating the maintenance data storage and retrieval server 128, the embodiments described herein that provide forward secrecy prevent the attacker from being able to associate newly generated usage data from a particular power tool 104 with the power tool after completion of the maintenance process.

While FIG. 1 depicts a maintenance system 120 that includes at least three separate computing devices, alternative embodiments of the maintenance system 120 include at least one computing device that implements the functions of the maintenance system 120 described herein. Various techniques that are known to the art including clustering, virtualization, containerization, and the like can provide isolation between the servers 124, 128, and 132 of the system 100 using multiple computing devices or a single computing device.

Figure 2:
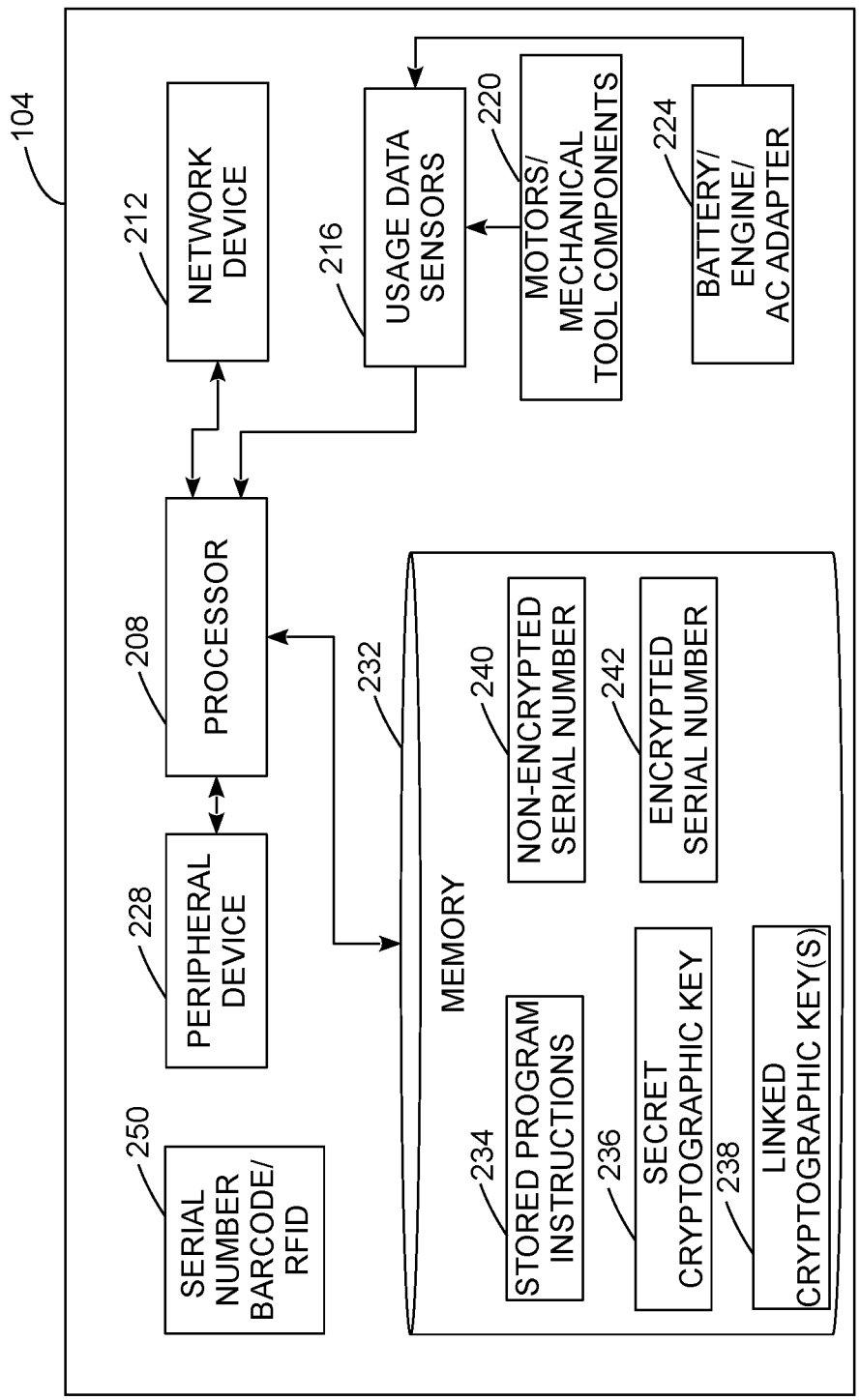
FIG. 2 is a schematic diagram of a power tool that is configured to anonymize usage data that are transmitted to a maintenance system.

FIG. 2 is a schematic diagram of components in one of the power tools 104 of FIG. 1. The power tool 104 includes a processor 208 that is operatively connected to a peripheral device 228, network device 212, usage data sensors 216, and a memory 232. The power tool 104 also includes one or more motors and mechanical tool components 220, a power source 224 such as a battery, engine, or an alternating current (AC) power adapter, and a serial number tag 250.

The processor 208 is a digital logic device that includes, for example, one or more microprocessors, microcontrollers, digital signal processors (DSPs), application specific integrated circuits (ASICs), field programmable gate arrays (FPGAs), and the like. The processor 208 optionally includes a hardware random number generator (RNG) or other hardware that generates cryptographic keys in a secure manner. While not depicted in further detail herein, some power tool embodiments incorporate the processor 208 in an electronic control device that also controls the operation of motors and other mechanical components 220 in the power tool and may further control operation of the battery or engine 224.

The usage data sensors 216 generate data related to the properties of different components in the power tool 104 or conditions experienced by the power tool 104 during operation of the power tool 104. Examples of usage data sensors 216 that generate usage data during operation of the power tool 104 include, but are not limited to, motor tachometer and torque sensors, accelerometers that can detect vibration or other movements of the power tool, temperature sensors, and electrical voltage and current sensors in embodiments that draw electricity from a battery or other electrical generation source. During operation of the power tool, the usage data sensors record information that the processor 208 receives and transmits to the data collection and index server 124 in association with the encrypted serial number 242 for the power tool 104. In the power tool 104, the usage data sensors 216 or the processor 208 incorporate a data interface that converts analog sensor data into digital signals using, for example, analog to digital converters, filters, and isolation circuits such as galvanic isolation or electro-optical isolation circuits.

The network device 212 is a wired or wireless networking device that provides data communication between the power tool 104 and one or more remote computing devices in the maintenance system 120 using, for example, an Internet Protocol (IP) based data network. For handheld and other portable power tool embodiments, the network device 212 is typically a wireless local area network (WLAN) or wireless wide area network (WWAN) network adapter. For larger power tools that typically remain in a fixed position during operation, the network device 212 may be a WLAN or WWAN network adapter or a wired data network interface such as an Ethernet adapter.

The peripheral device 228 is a wired serial bus port such as RS-232 or RS-485, a universal serial bus (USB) port, a short-range wireless data transceiver such as a Bluetooth or infrared transceiver, or any other suitable short-distance peripheral connection device. The peripheral device enables short-range communication between the power tool 104 and an external computing device, such as the maintenance data storage and retrieval server 130, during a maintenance operation, but is generally not required to transmit usage data during normal operation of the power tool 104. In some embodiments, the processor 208 only transmits the secret cryptographic key 236 or a linked cryptographic key 238 via the peripheral device 228 during a maintenance operation to release the secret cryptographic key to enable the maintenance system to identify the usage data history of the power tool 104 and to verify the authenticity of the power tool 104.

The memory 232 includes one or more digital data storage devices including random access memory (RAM) and a non-volatile solid-state storage device such as NAND or NOR flash memory, or an electronically erasable programmable read only memory (EEPROM). In the embodiment of FIG. 2 the memory 232 holds stored program instructions 234 that the processor 208 executes to perform the functions described herein in conjunction with hardware components in the power tool 104. The memory 232 also stores one or more secret encryption keys 236 that the processor 208 uses to encrypt the non-encrypted serial number 240 stored in the memory 232 to generate the encrypted serial number data 242. In some embodiments that are described herein, the memory 232 also stores one or more linked cryptographic keys 238 that are generated using a hash chaining operation that uses an initial secret cryptographic key 236 as an input.

The serial number tag 250 is, for example, a physical serial number tag permanently affixed to the housing of the power tool 104 that includes a barcode or an RFID tag that encodes the non-encrypted serial number of the power tool 104 to enable an external device, such as the maintenance data storage and retrieval server 128, to read the non-encrypted serial number of the power 104 during a maintenance operation. The serial number tag 250 stores the same serial number as the non-encrypted serial number 240 that is stored in the memory 232.

As described in more detail below, during operation the power tool 104 uses at least one cryptographic key stored in the memory 232 to generate an encrypted serial number that is based on the non-encrypted serial number that is assigned to the power tool during manufacture. As the power tool 104 is operated during normal use, the processor 208 collects usage information from the usage data sensors 216 and transmits the usage data to the maintenance system 120 using the network device 212. The processor 208 transmits the usage data only in association with the encrypted serial number, which prevents the maintenance system 120 from being able to determine the user who operates the power tool 104 since a large number of power tools 104 all transmit usage data in association with encrypted serial numbers to the maintenance system 120.

Figure 3:
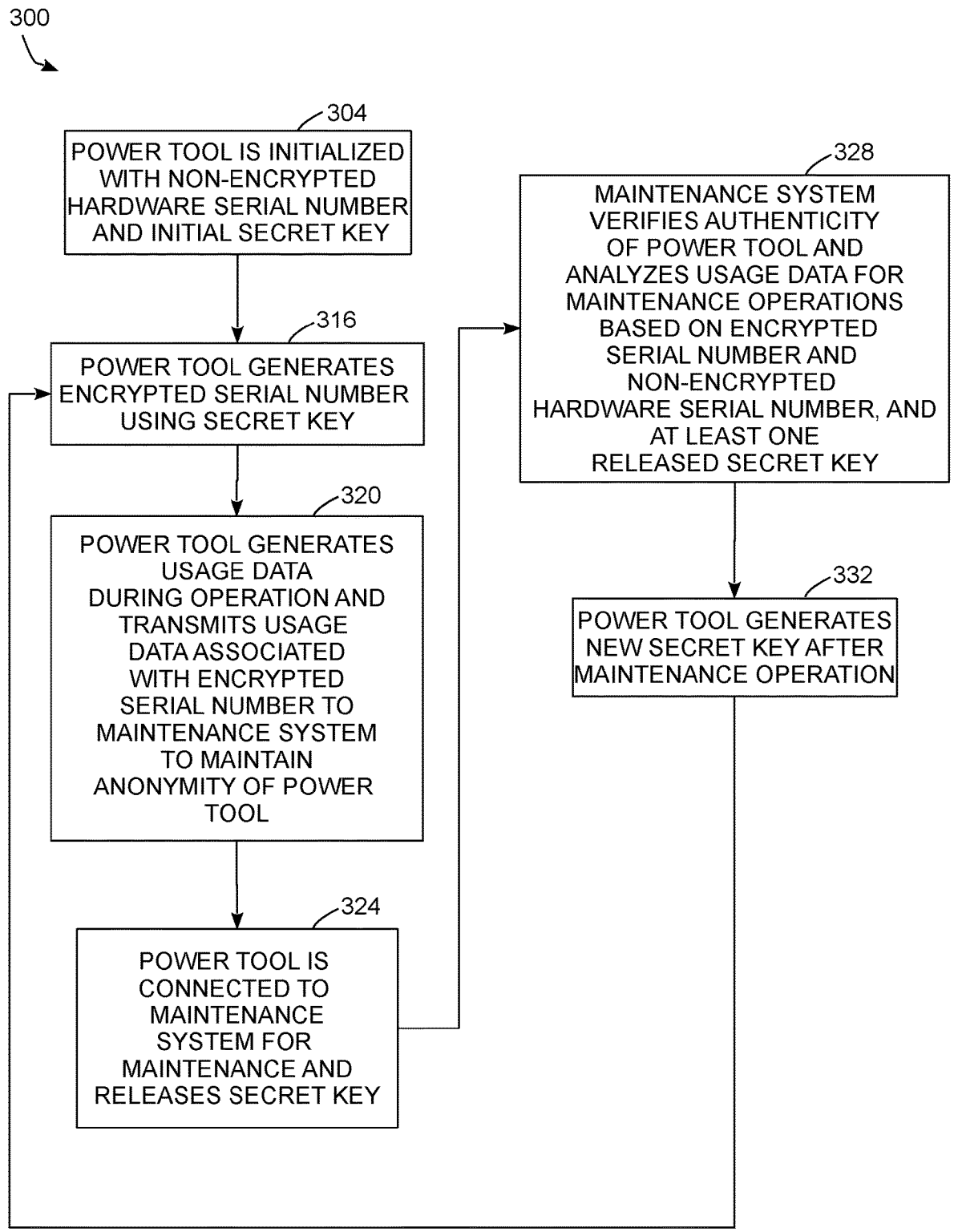
FIG. 3 is a block diagram of a process for anonymizing usage data transmitted from power tools to a maintenance system.

FIG. 3 depicts a process 300 for operation of a power tool in conjunction with a maintenance system to provide anonymity to usage data that are transmitted from the power tool to the maintenance system during operation of the power tool. In the description below a reference to the process 300 performing a function or action refers to the operation of a processor in one or more computing devices to execute stored program instructions to perform the function or action in conjunction with hardware components. The process 300 is described in conjunction with the system 100 of FIG. 1 and the power tool of FIG. 2 for illustrative purposes.

The process 300 begins as the power tool 104 is initialized with a non-encrypted serial number and secret encryption key that are stored in the memory 232 of the power tool 104 (block 304). In the embodiment of FIG. 2, the processor 208 stores the non-encrypted serial number 240 in the memory 232 at the time of manufacture of the power tool, and the non-encrypted serial number 240 matches the serial number that is placed in the serial number tag 250. In some embodiments, the serial number data 240 are stored in a small non-erasable memory device at the time of manufacture that cannot be erased or altered by the processor 208. In other embodiments, the serial number is included in firmware along with the stored program instructions 234 that are stored in the memory 232 at the time of manufacture of the power tool 104. During the process 300, the processor 208 generates the secret cryptographic key 236 using a hardware random number generator or a cryptographically secure key generation function as described above, and the secret cryptographic key 236 is not disclosed to any external computing device. During the process 300, the processor 208 generates at least one secret cryptographic key 236, but as described in further detail below, in some embodiments the processor 208 generates multiple cryptographic keys 236 that the memory 232 stores for use during operation and maintenance procedures. The processor 208 can generate the secret cryptographic key 236 at the time of manufacture or during the initial setup of the power tool when first used by a customer.

The process 300 continues as the power tool 104 generates an encrypted serial number using the secret cryptographic key (block 316). In the power tool 104, the processor 208 uses a predetermined encryption function, such as a block or stream symmetric encryption scheme, or an HMAC that uses the serial number and the secret cryptographic key as inputs, that is otherwise known to the art to encrypt the non-encrypted serial number 240 using the secret cryptographic key 236 to generate the encrypted serial number 242. One example of a block cipher encryption scheme that is known to the art is the advanced encryption system (AES). In another embodiment, the processor 208 generates the encrypted serial number based on the output of an HMAC function that is applied to the non-encrypted serial number data using the secret cryptographic key, which prevents any computing device that does not have access to the encryption key from determining the non-encrypted serial number when provided with the HMAC function output as the encrypted serial number. In some embodiments, the HMAC function is also used to verify the authenticity of the power tool during a maintenance operation as is described in more detail below. In one embodiment of the process 300, the processor 208 generates the encrypted serial number 242 after the power tool 104 is in the possession of a customer so that the manufacturer or other third party cannot associate the encrypted serial number 242 with the power tool 104 while the power tool is still in possession of the manufacturer or other third party prior to being transferred to the customer.

The process 300 continues as the power tool 104 generates usage data of the power tool and transmits the usage data in association only with the encrypted serial number to the maintenance system 120 to enable the maintenance system to keep records of power tool usage while maintaining the anonymity of the actual power tool that generates the usage data (block 320). In the power tool 104, the processor 208 receives usage data from one or more of the sensors 216 during operation of the power tool 104. As described above, the usage data can include sensor data about the operation of the motors and other mechanical components 220 in the power tool. In some embodiments, the usage data also includes sensor data related to a battery, AC power adapter, or engine 224 in the power tool, with one non-limiting example of sensor data including electrical current and voltage data for monitoring the state of charge and state of health of a battery in the power tool 104. In some embodiments, the power tool 104 and the maintenance system 120 establish an authenticated and encrypted communication channel for the transmission of the anonymized usage data, such as a communication channel that uses the transport layer security (TLS) protocol or other similar protocols, to prevent third parties from eavesdropping on the usage data during transit through a data network.

The processor 208 uses the network device 212 to transmit the usage data to the maintenance system 120 through a data network. In the embodiment of FIG. 1, the power tool 104 transmits the usage data to the data collection and indexing server 124, which subsequently stores the usage data in association with the encrypted serial number in the maintenance data storage server 132. The processor 208 transmits the usage data only in association with the encrypted serial number 242 to enable the maintenance system 120 to identify that different sets of usage data are generated by a single power tool, but to preserve the anonymity of the power tool since the maintenance system 120 cannot identify the non-encrypted serial number of the power tool 104 based on the encrypted serial number data. In one configuration, the processor 208 transmits a continuous stream of usage data while the power tool 104 is in operation with minimal delay between the generation and transmission of the usage data. In another embodiment, the processor 208 transmits the usage data in batches at regular time intervals or after a certain amount of usage data has been generated based on the duration of operation of the power tool 104. In some embodiments, the processor 208 temporarily stores the usage data in the memory 232 until the usage data are transmitted to the maintenance system 120.

The process 300 continues as the power tool 104 is connected to the maintenance system 120 during a maintenance process in which the power tool 104 releases the secret key to the maintenance system (block 324). During a maintenance operation, the customer typically transfers possession of the power tool 104 to a maintenance service provider during the maintenance process. Part of the maintenance process includes connecting the power tool 104 to the maintenance data storage and retrieval server 128. In one embodiment, the power tool 104 establishes a data connection to the maintenance data storage and retrieval server 128 using the peripheral device 228 for short-range transmission of the cryptographic key to the maintenance data storage and retrieval server 128. In other embodiments, the processor 208 in the power tool 104 establishes the data connection with the maintenance data storage and retrieval server 128 using the network device 212 and transmits the cryptographic key to the maintenance data storage and retrieval server 128 via a data network.

During the process 300, the maintenance system 120 optionally verifies the authenticity of the power tool 104 and uses the released cryptographic key that was received from the power tool 104 to retrieve and analyze a history of usage data as part of the maintenance process based on the cryptographic key received from the power tool, the encrypted serial number, and the non-encrypted serial number of the power tool 104 (block 328). In the optional verification process, the maintenance data storage and retrieval server 128 uses both the secret cryptographic key retrieved from the power tool 104 and the non-encrypted serial number of the power tool that is contained on the serial number tag 250 or transmitted from the power tool 104 to re-generate the encrypted serial number that was received from the power tool 104. The maintenance data storage and retrieval server 128 authenticates that the power tool 104 is valid if the re-generated encrypted serial number matches the encrypted serial number received from the power tool 104 and if the encrypted serial number matches the encrypted serial number corresponding to usage data that are stored in the anonymized power tool usage data database 134 that is stored on the maintenance data storage server 132. In practical embodiments of the system 100, only the proper cryptographic key of the legitimate power tool 104 can reproduce the encrypted serial number when applied to the non-encrypted serial number, such as through the use of the HMAC function using the secret cryptographic key applied to the non-encrypted serial number to produce the encrypted serial number based on the output of the HMAC function. The maintenance data storage and retrieval server 128 also identifies the non-encrypted serial number of the power tool 104 in the serial number and customer database 130 to ensure that the power tool is registered for maintenance with the maintenance system 120. The optional verification process enables the maintenance system 120 to confirm that the power tool 104 is an authentic power tool that generated the usage data used during the maintenance operation. In another configuration, a separate verification process that is not linked to the cryptographic keys that anonymize the usage data is used to verify the authenticity of the power tool. If the maintenance system 120 determines that a power tool is not authentic in response to the regenerated encrypted serial number not matching the encrypted serial number received from the power tool 104 or to an invalid non-encrypted serial number, then the maintenance system 120 halts the maintenance process.

During the maintenance operation, the maintenance data storage and retrieval server 128 transmits the encrypted serial number received from the power tool 104 in a search query to the maintenance data storage server 132. The maintenance data storage and retrieval server 128 receives the usage data as part of the diagnostic process to identify problems with the power tool or to identify components that should be serviced or replaced during a routine maintenance process. After completion of the maintenance operation, the power tool 104 is disconnected from the maintenance data storage and retrieval server 128.

The maintenance data storage and retrieval server 128 deletes the association between the encrypted serial number and the non-encrypted serial number of the power tool 104 after completion of each maintenance operation to maintain the anonymity of the previously generated usage data. In particular, within the maintenance system 120 of FIG. 1, the maintenance data storage and retrieval server 128 never transmits the cryptographic key received from the power tool 104 and never transmits the association between the non-encrypted serial number 104 and the encrypted serial number to the maintenance data storage server 132. Thus, during normal operation of the maintenance system 120 the third party computing devices 180 that are granted access to the anonymized usage data in the database 134 do not receive information that enables the third party computing devices 180 to associate the encrypted serial numbers stored in the maintenance data storage server 132 with the non-encrypted serial number of a particular power tool 104. However, if an attacker compromises the maintenance system 120, then the attacker can presumably breach the anonymity of previously recorded usage data that are stored in the database 134 of the maintenance storage server 132 during a maintenance operation by observing the released cryptographic key that the power tool 104 releases to the maintenance data storage and retrieval server 128. As described below, in at least some embodiments the process 300 provides forward privacy that preserves anonymity of the usage data that are transmitted from the power tool 104 after the completion of the maintenance operation even if an attacker is able to breach the anonymity of previously recorded usage data.

Process 300 continues after completion of the maintenance process as the processor 208 in the power tool 104 generates a new secret key (block 332). In one embodiment, the processor 208 generates a new secret cryptographic key using the same process that was used to generate the earlier cryptographic key as is described above with reference to the processing of block 304. The process 300 then returns to the processing of block 316 as the power tool 104 generates a newly encrypted serial number by applying the based on the non-encrypted serial number by applying the encryption function using the newly generated cryptographic key, and the power tool 104 transmits usage data to the maintenance system 120 using the newly encrypted serial number. The newly generated secret cryptographic key is unrelated to the previously used cryptographic key and preserves forward privacy because the newly generated encrypted serial number cannot be linked to the previous encrypted serial number. In this embodiment, the processor 208 stores all of the generated cryptographic keys 236 in the memory 232 for subsequent maintenance operations. In the subsequent maintenance operations, the power tool 104 releases each of the encryption keys to enable the maintenance data storage and retrieval server 128 to retrieve an entire history of the usage data of the power tool 104 going back over multiple maintenance cycles using the multiple encrypted serial numbers that are associated with the power tool 104.

In another embodiment, the processor 208 in the power tool 104 generates the initial cryptographic $K_i$ and stores the cryptographic key Ki with the cryptographic key data 236 but never uses the initial key Ki to encrypt the serial number directly. Instead, the processor 208 uses the key Ki and a randomly generated number-only-once (nonce) as inputs to a cryptographically secure pseudo-random function (PRF) to generate the initial cryptographic key used in the first cycle of the process 300 and the processor 208 repeats the process with newly generated nonces to generate additional cryptographic keys that are all based on the original cryptographic key Ki. For example, in a first cycle of the process 300 the processor 208 generates a first key $K_i^{(1)} \leftarrow PRF(K_i, nonce_1)$ that is used to generate the first encrypted serial number using $K_i$ and $nonce_1$ as seeds to the PRF. In a subsequent cycle of the process 300, the processor 208 generates the second key: $K_i^{(2)} \leftarrow PRF(K_i, nonce_2)$ that is used to generate the second encrypted serial number using a different seed $K_i$, $nonce_2$ that generates a different key where the nonce values never repeat during the generation of additional cryptographic keys. The processor 208 uses the newly generated key $K_i^{(2)}$ to generate the second encrypted serial number and preserve forward privacy. During each maintenance operation, the power tool 104 transmits a complete history of all the encryption keys to the maintenance data storage and retrieval server 128, which retrieves an entire history of the usage data of the power tool 104 going back over multiple maintenance cycles using the multiple encrypted serial numbers that are associated with the power tool 104. However, the power tool 104 does not need to store the entire history of cryptographic keys in the memory 232. Instead, after starting with $nonce_1$, the additional nonce values $nonce_2$, $nonce_3$, etc. may be generated using the pseudo-random function as applied to the previous nonce values, which enables the power tool 104 to reduce the memory storage requirements for cryptographic data since the processor 208 can reproduce all of the generated cryptographic keys using only the initial key $K_i$ and the initial nonce $nonce_1$ as inputs to the pseudo-random function along with a counter that determines the number of cryptographic keys to be regenerated.

In another embodiment, the processor 208 in the power tool 104 uses a series of non-repeating but predetermined index values $index_j$ in conjunction with an initial cryptographic key $K_i$ to generate a cryptographic key that is used to encrypt the serial number of the power tool 104 during each cycle of the process 300 using the PRF: $K_i^{(j)} \leftarrow PRF(K_i, index_j)$ for j=1, 2, 3, . . . j. The index value is, for example, an integer counter that increments to produce a non-repeating value during each cycle of the process 300 or a numeric timestamp value that corresponds to a time period during which the power tool 104 generates a newly encrypted serial number in association with sets of usage data that are generated during that time period. This embodiment only requires the power tool 104 to generate and transmit the original cryptographic key $K_i^{(1)}$ and the most recent index counter $index_j$ to the maintenance data storage and retrieval server 128 during each maintenance operation since the maintenance data storage and retrieval server 128 can then regenerate each of the encryption keys and the corresponding encrypted serial numbers for all of the maintenance cycles of the process 300 using only $K_i^{(1)}$, a series of index values starting from the original index value through the current index value $index_j$, and the non-encrypted serial number of the power tool 104 as inputs. This embodiment does not provide forward privacy, however, since an attacker who has compromised the maintenance system 120 can reproduce subsequent cryptographic keys and determine the encrypted serial numbers after having observed at least one released cryptographic key that the power tool 104 transmits to the maintenance data storage and retrieval server 128.

The process 300 continues over multiple maintenance cycles as described above with reference to the processing of blocks 316-332 to enable each of the power tools 104 in the system 100 to generate and transmit usage data in association with encrypted serial numbers to the maintenance system 120. As described above, during each maintenance operation the maintenance system 120 optionally verifies and processes the usage data for a given power tool 104 while the preserving anonymity of the usage data for each power tool that is stored in the power tool usage data database 134 in the maintenance data storage server 132.

Figure 4:
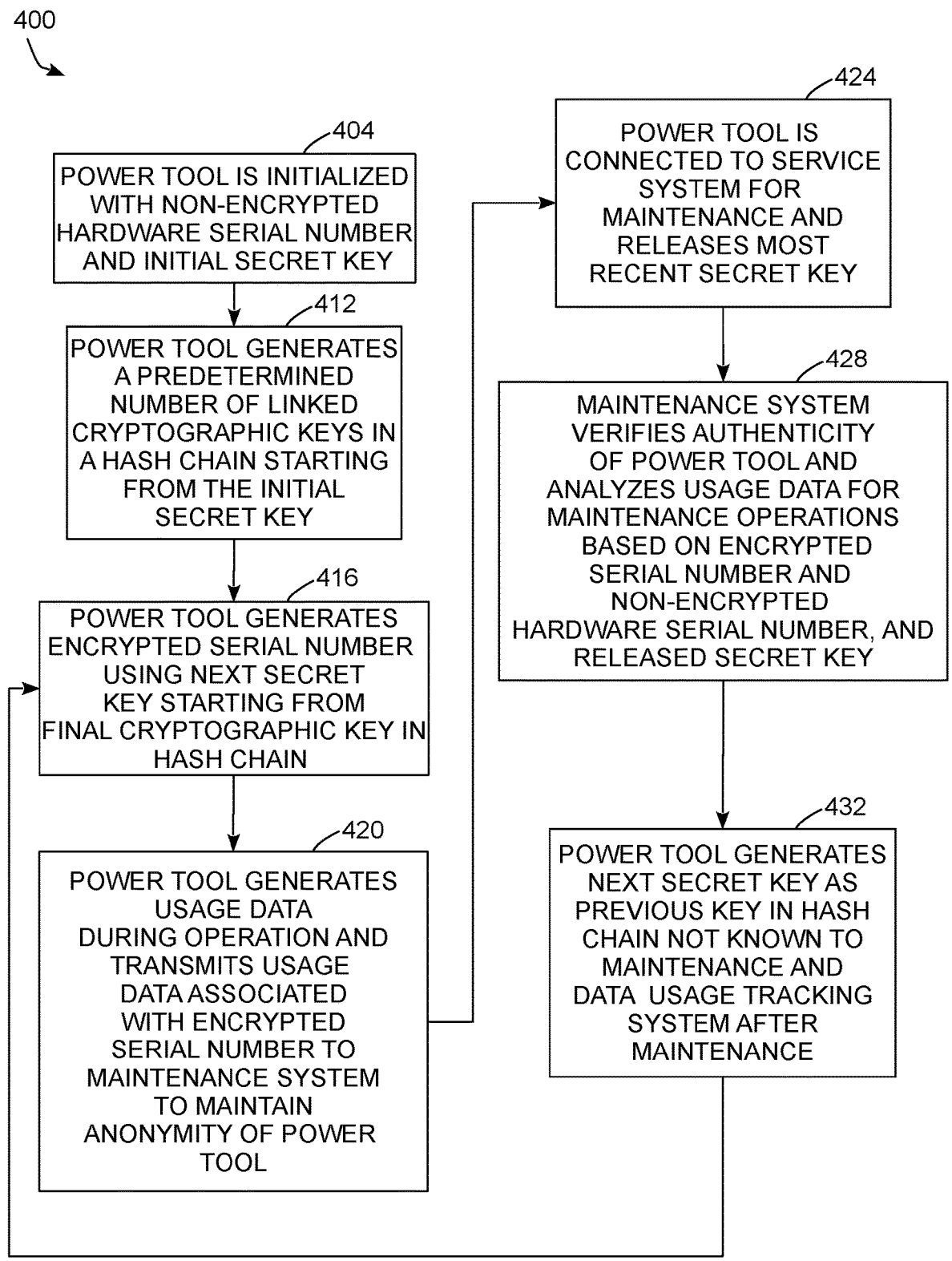
FIG. 4 is a block diagram of another process for anonymizing usage data transmitted from power tools to a maintenance system.

FIG. 4 depicts another process 400 for operation of a power tool in conjunction with a maintenance system to provide anonymity to usage data that are transmitted from the power tool to the maintenance system during operation of the power tool. In the description below a reference to the process 400 performing a function or action refers to the operation of a processor in one or more computing devices to execute stored program instructions to perform the function or action in conjunction with hardware components. The process 400 is described in conjunction with the system 100 of FIG. 1 and the power tool of FIG. 2 for illustrative purposes.

The process 400 begins as the power tool 104 is initialized with a non-encrypted serial number and secret encryption key that are stored in the memory 232 of the power tool 104 (block 404). In the embodiment of FIG. 2, the processor 208 stores the non-encrypted serial number 240 in the memory 232 at the time of manufacture of the power tool, and the non-encrypted serial number 240 matches the serial number that is placed in the serial number tag 250. In some embodiments, the serial number data 240 are stored in a small non-erasable memory device at the time of manufacture that cannot be erased or altered by the processor 208. In other embodiments, the serial number is included in firmware along with the stored program instructions 234 that are stored in the memory 232 at the time of manufacture of the power tool 104. During the process 400, the processor 208 generates the initial secret cryptographic key 236 using a hardware random number generator or a cryptographically secure key generation function as described above, and the initial secret cryptographic key 236 is not disclosed to any external computing device. The processor 208 can generate the initial secret cryptographic key 236 at the time of manufacture or during the initial setup of the power tool when first used by a customer.

The process 400 continues as the processor 208 generates a predetermined number of lined cryptographic keys in a hash chain starting with the initial secret cryptographic key, which is also referred to as the first key, as an input (block 412). During the process 400, the processor 208 generates a plurality of linked cryptographic keys using the first secret cryptographic key data 236 stored in the memory 232 in the power tool 104 and a one-way function, where the one-way function is, for example, a cryptographically secure hash function such as SHA-2 or SHA-3. The processor 208 generates each linked cryptographic key in the plurality of linked cryptographic keys based on an output of the one-way function applied to a previous linked cryptographic key in the plurality of linked cryptographic keys in a predetermined order starting with the first secret cryptographic key until generating a final linked cryptographic key in the plurality of linked cryptographic keys. As described above, the processor 208 uses the initial secret cryptographic key $K_i$ as a first value to the input hash chain and uses the one-way hash function H to generate additional keys up to a predetermined number L: $K_1=H(K_i)$, $K_2=H(K_1)$, $K_3=H(K_2)$, ... $K_L=H(K_{L-1})$.

In the generation of the hash chain, the value of L may vary based on the power tool, but in at least some embodiments the value of L is selected to be large enough to meet or exceed the expected number of maintenance operations that will occur over the entire operational lifetime of the power tool. For example, given a power tool with an expected lifetime of twenty years and a comparatively high weekly maintenance rate (i.e. 52 maintenance operations per year), the processor 208 generates the hash chain with L=1040 values or a somewhat larger number to provide additional margin. Many consumer power tools will of course have a substantially lower number of expected lifetime maintenance operations and can generate shorter hash chains that are suitable for the expected number of service operations for the life of the power tool (e.g. twice a year). The efficient generation of hash chains with at least several thousand linked cryptographic key values is within the capabilities of many processors that are commercially available for power tools.

In the power tool 104, the processor 208 stores the final cryptographic key $K_L$ from the hash chain $K_L$ in the linked cryptographic key data 238 in association with the numeric value of L in addition to storing the initial secret cryptographic key $K_i$ in the secret cryptographic key data 236. In some embodiments with sufficient memory storage capacity, multiple cryptographic keys in the hash chain or all of the cryptographic keys in hash chain are stored in the linked cryptographic key data 238. In the embodiment of FIG. 2, the power tool 104 only stores the linked cryptographic key 238 that is currently in use in the memory 232, starting from the final linked cryptographic key $K_L$, which greatly reduces the memory storage requirements for the cryptographic key hash chain. The processor 208 can regenerate any individual cryptographic key or sets of cryptographic keys in the hash chain by starting with the initial secret cryptographic key data 236 for $K_i$, so the memory 232 is not required to hold all of the linked cryptographic keys in the hash chain.

While FIG. 2 depicts an embodiment of the memory 232 that stores the currently used linked cryptographic key data 238, in another embodiment the memory 232 only stores a counter value, starting from L, for the current link in the hash chain that was used to generate the encrypted serial number data 242. In this embodiment, the processor 208 only uses the generated cryptographic key from the hash chain starting from $K_L$ ephemerally to generate the encrypted serial number before deleting the cryptographic key.

The process 400 continues as the processor 208 in the power tool 104 generates an encrypted serial number (block 416). In the power tool 104, the processor 208 uses a predetermined encryption function, such as a block or stream symmetric encryption scheme, or an HMAC that uses the serial number and the linked cryptographic key as inputs, that is otherwise known to the art to encrypt the non-encrypted serial number 240 using the linked cryptographic key to generate the encrypted serial number 242. As described above with reference to the processing of block 316 in the process 300, the processor 208 can apply any suitable encryption function including a block cipher, stream cipher, or HMAC function to the non-encrypted serial number data 240 using the linked cryptographic key to generate the encrypted serial number data 242. In one embodiment of the process 400, the processor 208 generates the encrypted serial number 242 after the power tool 104 is in the possession of a customer so that the manufacturer or other third party cannot associate the encrypted serial number 242 with the power tool 104 while the power tool is still in possession of the manufacturer or other third party prior to being transferred to the customer.

Figure 5:
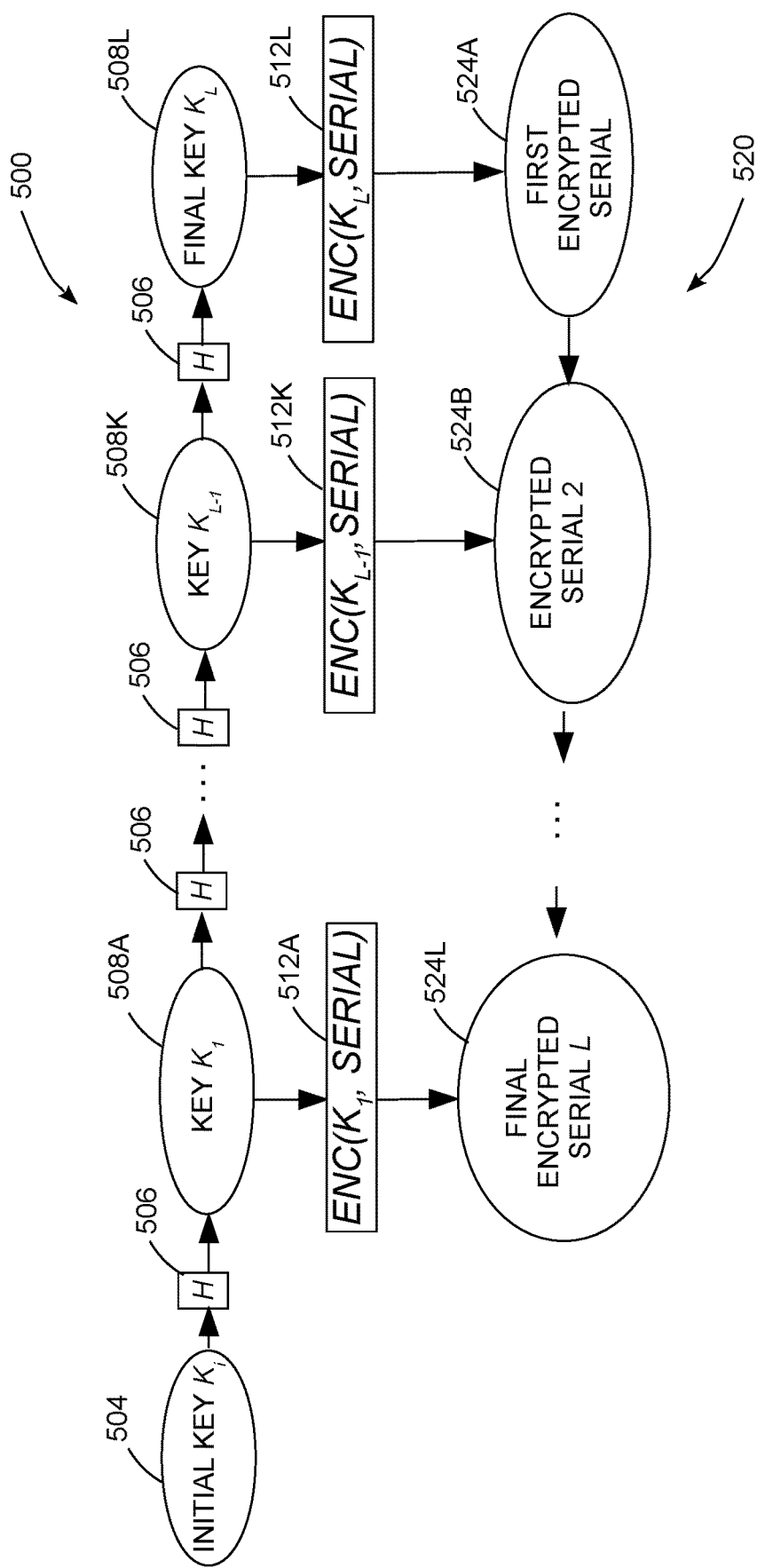
FIG. 5 is a diagram depicting a hash chain of cryptographic keys that are used to generated encrypted serial numbers in a power tool.

FIG. 5 depicts a hash chain of cryptographic keys that are used to generate encrypted serial numbers as is described above with reference to the processing of blocks 412 and 416. In FIG. 5, the processor 208 generates a hash chain of linked cryptographic keys by applying the cryptographically secure one-way function H, which is depicted as hash function 506 in FIG. 5, to the initial key 504 ($K_i$) to generate the first linked key in the hash chain 508A ($K_1$). The processor 208 continues to generate each linked cryptographic key in the plurality of linked cryptographic keys based on an output of the one-way function applied to a previous linked cryptographic key in the plurality of linked cryptographic keys in a predetermined order until generating a final linked cryptographic key 508L ($K_L$) in the plurality of linked cryptographic keys that form the hash chain 500. For example, in FIG. 5 the processor 208 uses the key 508A as an input to the hash function 506 to generate another linked cryptographic key in the plurality of linked cryptographic keys and continues until generating the penultimate key 508K ($K_{L-1}$) and the final cryptographic key 508L.

The linked cryptographic keys in the hash chain 500 enable the processor 208 to generate a series of encrypted serial numbers 520. To generate the first encrypted serial number 524A, the processor 208 applies the encryption function ENC shown in reference 512L to the non-encrypted serial number using the final key 508L as the encryption key. As described in further detail below, during subsequent maintenance cycles of the process 400, the processor 208 either regenerates different cryptographic keys in the hash chain 500, or retrieves the keys from the memory 232, to serve as the cryptographic keys to generate newly encrypted serial numbers for the power tool 104. For example, after the power tool 104 releases the final cryptographic key $K_L$ to the maintenance system 120, the processor 208 uses the previous linked cryptographic key 508K with the encryption function 512K to generate a second encrypted serial number 524B. The power tool 104 continues to use the previous linked cryptographic key in the hash chain 500 during additional maintenance cycles until reaching the first linked cryptographic key 508A that the processor 208 uses with the encryption function 512A to produce the final encrypted serial number 524L. While not depicted in FIG. 5, the initial key $K_i$ can be used to generate one additional encrypted serial number as well, although as described above in many embodiments the hash chain is generated with a sufficient number of linked cryptographic keys to cover the entire operational lifetime of the power tool 104. If a hash chain is exhausted, then the processor 232 can generate a new initial cryptographic key $K_i'$ that forms the basis for a new hash chain.

Referring again to FIG. 4, the process 400 continues as the power tool 104 generates usage data of the power tool and transmits the usage data in association only with the encrypted serial number to a maintenance system to enable the maintenance system to keep records of power tool usage while maintaining the anonymity of the actual power tool that generates the usage data (block 420). One benefit of this operation occurs in applications where multiple users share a single power tool and providing anonymity to the power tool has the benefit of also providing anonymity to the human users of the power tool since there is no link between the physical whereabouts of workers using the tool. The power tool 104 performs this operation in substantially the same manner as is described above with reference to the processing of block 320 in the process 300. In particular, the power tool 104 uses the network device 212 to transmit the usage data in association with the encrypted serial number to the data collection and index server 124.

The process 400 continues as the power tool 104 is connected to the maintenance system 120 for a maintenance operation and the power tool 104 releases the secret key to the maintenance system (block 424). In the system 100, the power tool 104 establishes a data connection to the maintenance data storage and retrieval server 128 using the peripheral device 228 or the network device 212. The processor 208 transmits the secret encryption key that was used to generate the encrypted serial number starting from the final key $K_L$ in the plurality of linked cryptographic keys in the first cycle of the process 400. The power tool 104 also transmits the encrypted serial number to the maintenance data storage and retrieval server 128 and optionally transmits the non-encrypted serial number of the power tool 104 using the data connection or via scanning of the serial number tag 250.

During the process 400, the maintenance system 120 optionally verifies the authenticity of the power tool 104 and uses the released cryptographic key that was received from the power tool 104 to retrieve and analyze a history of usage data as part of the maintenance process based on the cryptographic key received from the power tool, the encrypted serial number, and the non-encrypted serial number of the power tool 104 (block 428). The verification of the authenticity of the power tool 104 and the retrieval of the usage data in the process 400 is similar to that of the processing described above with reference to block 328 in the process 300 with the following differences. In process 400, the processor 208 in the power tool is only required to transmit the most recently used linked encryption key to the maintenance data storage and retrieval server 128, even if the power tool 104 has undergone multiple maintenance cycles for which the maintenance data storage server 134 has multiple sets of usage data that are associated with multiple encrypted serial numbers for the power tool 104. In one example, the power tool 104 that has previously undergone three maintenance cycles releases the fourth secret key $K_{L-4}$ relative to the final cryptographic key $K_L$ in reverse order as depicted in FIG. 5. The maintenance data storage and retrieval server 128 uses the released key $K_{L-4}$ to perform the optional validation of the authenticity of the power tool 104, and if the power tool 104 is authenticated the maintenance data storage and retrieval server 128 uses the release key $K_{L-4}$ and the one-way function H to regenerate the rest of the linked plurality of cryptographic keys through the final key $K_L$ at end of the hash chain using the same process that the power tool 104 originally performed to generate the cryptographic keys in the hash chain. The maintenance data storage and retrieval server 128 then regenerates all of the encrypted serial numbers for the power tool 104 using the keys and the none-encrypted serial number of the power tool 104, and retrieves the full usage data history for the power tool 104 from the maintenance data storage server 132 using the plurality of regenerated encrypted serial numbers. Thus, during each maintenance cycle of the process 400, the processor 208 only needs to release the most recently used encryption key to the maintenance system 120 since the maintenance system 120 can regenerate all of the previously used encryption keys in the chain hash to enable retrieval and analysis of the anonymized usage data from the power tool 104 over one or more previous maintenance cycles.

The process 400 continues after completion of the maintenance operation as the processor 208 in the power tool 104 updates the secret encryption key to use the previous cryptographic key in the plurality of linked cryptographic keys from the has chain (block 432). In the power tool 104, the processor 208 either regenerates the next cryptographic key starting from the initial cryptographic key $K_i$ as described above or retrieves the next cryptographic key from the linked cryptographic key data 238 in the memory 232. Using the plurality of linked cryptographic key in the hash chain 500 of FIG. 5 as an example, the processor 208 uses the key $K_{L-1}$ after using the key $K_L$. The process 400 provides forward privacy because, while the maintenance system 120 is capable of regenerating cryptographic keys that occur after each released cryptographic key in the hash chain, the one-way function H prevents the maintenance system 120 from being able to determine any of the previous cryptographic keys in the hash chain until the power tool 104 releases the cryptographic key during the maintenance operation. Thus, the maintenance system 120 cannot determine the key $K_{L-1}$ or any other prior cryptographic keys in the hash chain 500 even if the power tool 104 releases the key $K_L$. The process 400 continues with one or more additional maintenance cycles in the processing of blocks 416-432 as the power tool 104 generates a new encrypted serial number using the updated cryptographic key that has not been released to the maintenance system 120 to enable the anonymized transmission of additional usage data to the maintenance system 120 during further operation of the power tool 104.

The systems and methods described herein represent improvements the function of computing devices over the art. The improvements include, but are not limited to, anonymizing the usage data that power tools generate and transmit to a maintenance system to reduce or eliminate the ability of the maintenance system 120 and the third party computing devices 180 to track users of individual power tools even if an attacker compromises the maintenance system 120. During normal operation of the system 100 using either of processes 300 and 400 that are described above, the maintenance system 120 maintains anonymity of all usage data that are received from the power tools 104. Since the power tool itself stores the key that is used to anonymize the usage data, any maintenance system must have possession of the power tool to link the usage data with a user and cannot continue to track the power tool and users of the power tool after a power tool returns to use in the field. During a maintenance operation, the maintenance data storage and retrieval server 128 retrieves the usage data from the maintenance data storage server 132 based only on the encrypted serial number, which still prevents third party computing devices 180 that can access the usage data in the database 134 from being able to determine the particular power tool 104 that is associated with any particular set of usage data. The maintenance data storage and retrieval server 128 deletes the association between the encrypted serial number and the actual serial number of a power tool after completion of each maintenance operation. However even if an attacker compromises the maintenance system 120 in a manner that could enable the third parties 180 to identify the association between the encrypted serial numbers and an individual power tool 104, the system 100 and the processes 300 and 400 still protect the anonymity of the usage data of power tools prior to a maintenance operation that potentially removes the anonymity of previously recorded usage data. Additionally, in the embodiments described above that enable forward privacy, even if an attacker compromises the maintenance system 120 to remove the anonymity of older usage data that was generated in earlier maintenance cycles, the attacker still cannot breach the anonymity of the newest usage data from the power tools 104 that are generated after the most recent maintenance operation. Furthermore, the embodiments described herein provide computationally efficient processes that enable anonymization of usage data from power tools while enabling power tools with even comparatively low performance processors and small capacity memories to generate the anonymized usage data.

It will be appreciated that variants of the above-described and other features and functions, or alternatives thereof, may be desirably combined into many other different systems, applications, or methods. Various presently unforeseen or unanticipated alternatives, modifications, variations or improvements may be subsequently made by those skilled in the art that are also intended to be encompassed herein in the following claims.

What is claimed:

1. A method for network-connected tool operation with user anonymity comprising:
generating, with a processor in a power tool, a first cryptographic key that is stored in a memory in the power tool;
generating, with the processor, a first encrypted serial number for the power tool based on an output of an encryption function using the first cryptographic key applied to a non-encrypted serial number for the power tool stored in the memory;
generating, with the processor, usage data based on data received from at least one sensor in the power tool during operation of the power tool; and
transmitting, with a network device in the power tool, the usage data in association only with the first encrypted serial number to a maintenance system to enable usage data collection that prevents identification of the power tool as being associated with the usage data.

2. The method of claim 1 further comprising:
establishing a data connection between the power tool and the maintenance system during a maintenance operation for the power tool;
transmitting, with the processor in the power tool, the first cryptographic key to the maintenance system via the data connection to enable the maintenance computing system to identify the usage data associated with the power tool only at the time of the maintenance operation;
generating, with a processor in the power tool, a second cryptographic key that is stored in the memory in the power tool;
generating, with the processor, a second encrypted serial number for the power tool based on an output of the encryption function using the second cryptographic key applied to the non-encrypted serial number for the power tool stored in the memory;
generating, with the processor, additional usage data based on data received from the at least one sensor in the power tool during additional operation of the power tool after the maintenance operation; and
transmitting, with the network device in the power tool, the additional usage data in association only with the second encrypted serial number to the maintenance system to enable usage data collection that prevents identification of the power tool as being associated with the additional usage data.

3. The method of claim 2 further comprising: transmitting, with the processor in the power tool, the non-encrypted serial number to the maintenance system via the data connection;
regenerating, with the maintenance system, the first encrypted serial number based on another output of the encryption function using the first cryptographic key received from the power tool applied to the non-encrypted serial number received from the power tool; and
verifying, with the maintenance system, authenticity of the power tool in response to a match between the first encrypted serial number received from the power tool and the regenerated first encrypted serial number.

4. The method of claim 3 further comprising: generating, with the maintenance system, an alarm indicating the power tool is not authentic in response to the first encrypted serial number received from the power tool not matching the regenerated first encrypted serial number.

5. The method of claim 2, the establishing of the data connection between the power tool and the maintenance system further comprising: establishing the data connection between the power tool and the maintenance system using a peripheral device in the power tool that is different than the network device during the maintenance process.

6. The method of claim 1, further comprising: establishing, with the processor and the network device in the power tool, an authenticated and encrypted communication channel with the maintenance system for the transmitting of the usage data in association only with the first encrypted serial number.

7. A method for network-connected power tool operation with user anonymity comprising:
generating, with a processor in a power tool, a plurality of linked cryptographic keys using a first secret cryptographic key stored in a memory in the power tool and a one-way function, the generating further comprising:
generating each linked cryptographic key in the plurality of linked cryptographic keys based on an output of the one-way function applied to a previous linked cryptographic key in the plurality of linked cryptographic keys in a predetermined order starting with the first secret cryptographic key until generating a final linked cryptographic key in the plurality of linked cryptographic keys;
generating, with the processor, a first encrypted serial number for the power tool based on an output of an encryption function using the final linked cryptographic key applied to a non-encrypted serial number for the power tool stored in the memory;
generating, with the processor, usage data based on data received from at least one sensor in the power tool during operation of the power tool; and
transmitting, with a network device in the power tool, the usage data in association only with the first encrypted serial number to a maintenance system to enable usage data collection that prevents identification of the power tool as being associated with the usage data.

8. The method of claim 7 further comprising:
establishing a data connection between the power tool and the maintenance system during a maintenance operation for the power tool;
transmitting, with the processor in the power tool, the final linked cryptographic key to the maintenance system via the data connection to enable the maintenance computing system to identify the usage data associated with the power tool only at the time of the maintenance operation;
generating, with the processor, a second encrypted serial number for the power tool based on an output of the encryption function using a second linked cryptographic key in the plurality of linked cryptographic keys applied to the non-encrypted serial number for the power tool stored in the memory, the second linked cryptographic key being previous to the final linked cryptographic key in the plurality of linked cryptographic keys;
generating, with the processor, additional usage data based on data received from the at least one sensor in the power tool during additional operation of the power tool after the maintenance operation; and
transmitting, with the network device in the power tool, the additional usage data in association only with the second encrypted serial number to the maintenance system to enable usage data collection that prevents identification of the power tool as being associated with the additional usage data.

9. The method of claim 8 further comprising:
transmitting, with the processor in the power tool, the non-encrypted serial number to the maintenance system via the data connection;
regenerating, with the maintenance system, the first encrypted serial number based on another output of the encryption function using the final linked cryptographic key received from the power tool applied to the non-encrypted serial number received from the power tool; and
verifying, with the maintenance system, authenticity of the power tool in response to a match between the first encrypted serial number received from the power tool and the regenerated first encrypted serial number.

10. The method of claim 9 further comprising: generating, with the maintenance system, an alarm indicating the power tool is not authentic in response to the first encrypted serial number received from the power tool not matching the regenerated first encrypted serial number.

11. The method of claim 8, the establishing of the data connection between the power tool and the maintenance system further comprising: establishing the data connection between the power tool and the maintenance system using a peripheral device in the power tool that is different than the network device during the maintenance process.

12. The method of claim 7, wherein the one-way function is a cryptographically secure hash function.

13. A power tool configured for anonymized network-connected operation comprising:
at least one sensor;
a memory configured to store:
a non-encrypted serial number;
a first cryptographic key; and
usage data;
a network device; and
a processor operatively connected to the at least one sensor, the memory, and the network device, the processor being configured to:
generate the first cryptographic key that is stored in a memory in the power tool;
generate a first encrypted serial number for the power tool based on an output of an encryption function using the first cryptographic key applied to the non-encrypted serial number for the power tool stored in the memory;
generate the usage data based on data received from at least one sensor in the power tool during operation of the power tool; and
transmit the usage data in association only with the first encrypted serial number to a maintenance system with the network device to enable usage data collection that prevents identification of the power tool as being associated with the usage data.

14. The power tool of claim 13, the processor being further configured to: establish a data connection between the power tool and the maintenance system during a maintenance operation for the power tool;
transmit the first cryptographic key to the maintenance system via the data connection to enable the maintenance computing system to identify the usage data associated with the power tool only at the time of the maintenance operation;

generate a second cryptographic key that is stored in the memory in the power tool; generate a second encrypted serial number for the power tool based on an output of the encryption function using the second cryptographic key applied to the non-encrypted serial number for the power tool stored in the memory;

generate additional usage data based on data received from the at least one sensor in the power tool during additional operation of the power tool after the maintenance operation; and transmit the additional usage data in association only with the second encrypted serial number to the maintenance system with the network device to enable usage data collection that prevents identification of the power tool as being associated with the additional usage data.

15. The power tool of claim 14 further comprising:
a peripheral device that is different than the network device; and
the processor being operatively connected to the peripheral device and further configured to: establish the data connection between the power tool and the maintenance system using the peripheral device during the maintenance process.

16. The power tool of claim 13, the processor being further configured to: establish an authenticated and encrypted communication channel with the maintenance system with the network device for the transmission of the usage data in association only with the first encrypted serial number.

17. The power tool of claim 13 wherein the power tool is a motor vehicle.

* * * * *